Figure 1:
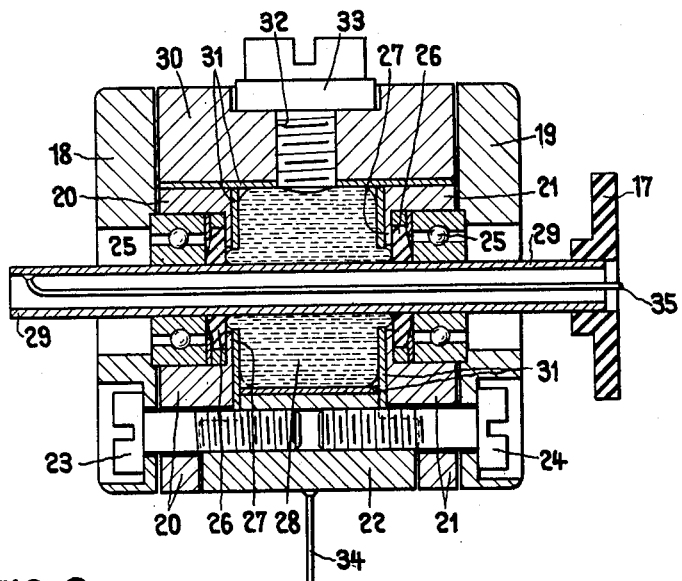

Feb. 20, 1962     C. ROHRBACH     3,022,479
DEVICE FOR ESTABLISHING AN ELECTRICAL
CONNECTION BETWEEN STATIONARY AND
ROTATING CONDUCTORS
Filed Dec. 16, 1958

INVENTOR
Christof Rohrbach

3,022,479
DEVICE FOR ESTABLISHING AN ELECTRICAL CONNECTION BETWEEN STATIONARY AND ROTATING CONDUCTORS
Christof Rohrbach, Berlin-Zehlendorf, Germany, assignor to Vibro-Meter A.G., Fribourg, Switzerland
Filed Dec. 16, 1958, Ser. No. 780,765
4 Claims. (Cl. 339—8)

This invention relates to a device for establishing an electrical connection between one or more stationary conductors and one or more rotating conductors, of the type used for transmitting electrical signals from a rotating machine part or the like to a stationary measuring equipment or vice versa. Transmitting devices of this type are often used for establishing the electrical connection between measuring instruments such as strain gauges, temperature measuring bridges or the like mounted on a rotating machine part of a turbine, a generator, a propeller or the like, and the measuring equipment which is kept stationary.

When connected into the circuits of high precision measuring equipment the transmitting characteristics of the device should remain absolutely constant throughout measuring periods of any duration. This is not possible with the well known slip-ring transmission because the slip rings and brushes cooperating therewith are subjected to rapid use and the resistance of such slip-ring connections is high and inconstant.

A smaller and more constant resistance may be obtained when using the well known mercury connecting devices having rotating contact discs or contact rings of relatively great diameter dipped in mercury contained in grooves or pans of stationary parts of conducting material. When the mercury is contained in stationary grooves, the discs rotating in the mercury contained in such grooves have to be of great diameter in order to properly press the mercury into the groove by centrifugal force even when the speed of the rotating discs is low. However, when the discs or rings are of large diameter, the sliding speed thereof in the stationary mercury has to be very high thereby causing substantial heating and wear of the device. The high operating temperature easily results in evaporation of the mercury so that the insulating properties of the device are reduced due to the presence of the mercury vapor whereas the transmitting resistance will gradually increase due to the loss of liquid mercury in the contacting places. Due to the large diameters of the contacting discs or rings relatively great quantities of contacting mercury are required in order to obtain reliable and constant transmission properties. These relatively large quantities of mercury are contained in open vessels such as grooves or pans so that the mercury will easily be split and evaporated, this being a danger for the health of the operating personnel.

It is the object of this invention to avoid these drawbacks of known devices and to improve the operating characteristics by providing a device of the type set out above for establishing an electrical connection between a stationary conductor and a rotating conductor and comprising broadly a hollow body of conducting material and a hollow cylinder of conducting material penetrating the said hollow body, two bearing members inserted between the said hollow body and the said hollow cylinder, the hollow cylinder being rotatably mounted in the said bearing members, the said bearing members being axially spaced from each other thereby forming a space between the said hollow body, the said hollow cylinder and the said bearing members respectively, a conducting liquid such as mercury filling the said space, and the said stationary and rotating conductor being connected to the said hollow body and to the said hollow cylinder respectively. Since the mercury or the like conducting liquid is completely enclosed in a space formed between the said hollow body the said bearing members and the said hollow cylinder it cannot escape or evaporate excessively. Further the dimensions of the said hollow body and hollow cylinder may be kept as small as mechanically possible and a very small quantity of mercury is able to fill the said space formed between the hollow body and the hollow cylinder. Since the diameter of the hollow cylinder rotating within the bearing members may be kept very small the friction occurring between this cylinder and the mercury contained in the said space is very small so that the mercury will practically not be heated by friction.

Figure 2:
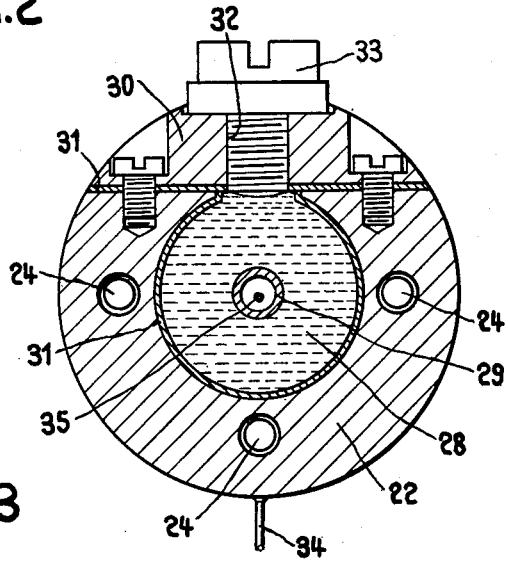
Figure 3:
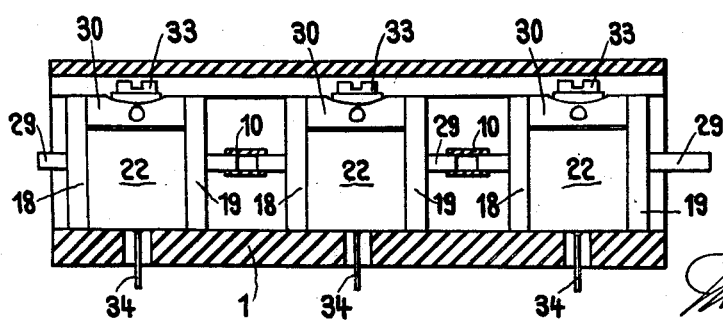

An embodiment of the invention is shown, by way of example, in the attached drawing, wherein FIG. 1 is an axial section of a unit according to the invention, FIG. 2 is a cross section of one current-transmitting unit, and FIG. 3 illustrates an assembly of three units.

The unit shown in FIGS. 1 and 2 has two mounting flanges 18 and 19 between which the other parts are mounted. The hollow body of this unit is formed by two annular members or rings 20 and 21 and a shell 22, the rings 20 and 21 being clamped between the mounting flanges and the shell 22 by means of screws 23 and 24. Ball bearings 25 and sealing discs 26 associated therewith are clamped between inwardly directed flanges 27 of the rings 20 and 21 respectively and shoulders of the mounting flanges 18 and 19. The space substantially ring-shaped containing the mercury 28 is formed by the hollow cylinder 29, the inner surfaces of rings 20 and 21, the inner surface of the shell 22 and a cover 30 removably attached to the shell 22 by screws not shown and closing a gap or opening of shell 22. The hollow cylinder 29 may be made completely of a platinum-iridium alloy and the other surfaces contacting the mercury, viz. the inner surfaces of rings 20 and 21, the inner surface of shell 22 and the inner surface of cover 30 may be coated with a sheet 31 of platinum-iridium alloy, for instance 0.1 mm. in thickness. Consequently the mercury only contacts surfaces consisting of or coated with the said platinum-iridium alloy whereby excellent current transmitting characteristics are obtained. Further corrosion and wear of such surfaces is avoided. The cover 30 has a screw-threaded filling opening 32 usually closed by means of a screw 33. The screw 33 may be removed for filling mercury into the hollow space or for releasing the mercury.

A current flow may be set up from a stationary conductor 34 through shell 22, the mercury 28, the hollow cylinder 29 and a rotating conductor 35 to a rotating machine part to which the hollow cylinder 29 may be connected for instance by means of an insulating coupling flange 17 as shown in FIG. 1. The current transmitting unit shown in FIGS. 1 and 2 may be mounted in a mantle of insulating material, and a number of current transmitting units as shown in FIGS. 1 and 2 may be assembled in a common tubular mantle 1 of insulating material, as indicated in FIG. 3, whereby the hollow cylinders 29 of adjacent units are mechanically connected to each other by means of insulating coupling tubes such as tubes 10 shown in FIG. 3. When using the unit shown in FIGS. 1 and 2 equipped with ball bearings and coupling elements 10 of resilient insulating material between separate units, very smooth and quiet running of the assembly is obtained.

The units of the type shown in FIGS. 1 and 2 may be of very small size, having for instance an over-all diameter of 16 mm. and a total length of 17 mm.

What I claim is:

1. A device for establishing independent electrical connections between a number of stationary conductors and a number of rotating conductors, comprising a number of elements having each an outer stationary metallic contact member of substantially cylindrical shape and having opposite ends, wall portions attached to and extending inwardly from the said opposite ends of the outer contact member, substantially parallel inner faces of the said wall portions arranged at a distance from each other, a substantially ring-shaped space being formed between the said outer contact member and inner faces of the wall portions attached thereto, bearing means at the inner ends of the said wall portions, a metallic hollow shaft having an axial length exceeding the axial length of the said outer contact member, rotatably mounted in the said bearing means and axially extending on each side from the said outer contact member and wall portions respectively, the said substantally ring-shaped space being closed at its inner end by the said hollow metallic shaft, a quantity of mercury filling the said substantially ring-shaped space between the hollow shaft and the said outer contact member, each of the said stationary conductors being connected to the said outer connecting member of one of the said elements and each of the said rotating conductors being connected to the said hollow shaft of one of the said elements forming an inner rotating contact member, a mounting tube of insulating material, wherein the said elements are mounted axially spaced from each other, and adjacent projecting ends of the said hollow shafts being mechanically interconnected by means of tubular coupling means of electrically insulating material, the said rotating conductors being accommodated inside the said hollow shafts and tubular coupling means respectively.

2. A system for establishing independent electrical connections between a number of stationary conductors and a number of rotating conductors, comprising identical contact units having each an outer stationary metallic contact member of substantially cylindrical shape and having opposite ends, bearing means inside the said opposite ends of the outer contact member, a substantially ring-shaped space being formed between the said outer contact member and the said bearing means, a metallic hollow shaft having an axial length exceeding the axial length of the said outer contact member, rotatably mounted in the said bearing means and axially and symmetrically extending on each side from the said outer contact member and bearing means respectively, a quantity of electrically conducting fluid filling the said substantially ring-shaped space between the hollow shaft and outer contact member, a tubular mounting member of insulating material having a bore of a diameter substantially equal to the outer diameter of the said outer contact member and adapted for coaxial accommodation of contact units in axially spaced relation within the bore of the mounting member and electrically insulated from each other, and coupling means of electrically insulating material for mechanically interconnecting ends of the said hollow shafts of contact units coaxially arranged in the said mounting member.

3. A device for establishing an electrical connection between a stationary conductor and a rotating conductor, comprising an outer metallic hollow member of substantially cylindrical shape including contact means and having a substantially cylindrical bore, annular members extending radially inwardly from opposite end portions of the bore, a substantially ring-shaped space being formed inside the said bore and annular members respectively, said annular members having substantially cylindrical inner surfaces, two ball bearings mounted each with its outer race on the said inner surface of one of said annular members, a hollow metallic shaft mounted in the inner races of the said ball bearings, sealing means at the inner side of each of the said ball bearings, each of the said sealing means in sealing relation between one of the said annular members and the said hollow shaft, the said substantially ring-shaped space being closed at its inner end by the said sealing means and hollow shaft respectively, a quantity of mercury filling the said substantially ring-shaped space and contacting the said hollow shaft and contact means of the said outer hollow member respectively thereby establishing a low-resistance electrical connection between the hollow shaft and outer contact member, the said conductors being connected to the said outer hollow member and the said hollow shaft respectively.

4. A device according to claim 3, the said annular members having inner wall portions extending radially inwards from the axially inner end of each of the said inner cylindrical surfaces carrying the outer race of the ball bearings, the said sealing means being tightly clamped between the said outer races of the ball bearings and the said inwardly extending portions.

References Cited in the file of this patent

UNITED STATES PATENTS

| | | |
|---|---|---|
| 1,362,170 | Merendino | Dec. 14, 1920 |
| 1,960,621 | Duplessis | May 29, 1934 |
| 2,494,244 | Jonard et al. | Jan. 10, 1950 |
| 2,636,066 | Sciaky | Apr. 21, 1953 |
| 2,702,890 | Hildebrandt | Feb. 22, 1955 |
| 2,716,223 | Griefen | Aug. 23, 1955 |
| 2,782,159 | Berry | Feb. 19, 1957 |
| 2,889,531 | Ellerman et al. | June 2, 1959 |